United States Patent Office 3,115,499
Patented Dec. 24, 1963

3,115,499
1-(2-HYDROXYETHYL)-3-AMINO-2-IMIDAZOLI-
DINE-THIONE
Julian G. Michels, Norwich, N.Y., assignor to The
Norwich Pharmacal Company, Norwich, N.Y., a corporation of New York
No Drawing. Filed Oct. 23, 1959, Ser. No. 848,198
1 Claim. (Cl. 260—309.7)

This invention relates to new closely related, 3-amino-2-imidazolidinethiones. The new compounds that I have invented may be represented by the formula:

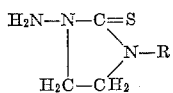

wherein R represents a member of the group consisting of hydrogen and hydroxyethyl.

These new compounds are useful as intermediates for the preparation of chemotherapeutically active 3-(5-nitrofurfurylideneamino)-2-imidazolidinethiones; more particularly, 3 - (5 - nitrofurfurylideneamino)-2-imidazolidinethione, which forms the subject matter of my copending application Serial No. 742,985, filed June 19, 1958 (U.S. Patent No. 2,920,074), and 1-hydroxyethyl-3-(5-nitrofurfurylideneamino)-2-imidazolidinethione which forms the subject matter of my copending application Serial No. 848,199, filed on even date herewith and now abandoned.

I have discovered that the new 3-amino-2-imidazolidinethiones which I have invented can be readily prepared. The method which I now prefer to employ involves nitrosation of 2-imidazolidinethione or its 1-(2-hydroxyethyl) derivative by means of an alkali nitrite such as sodium nitrite in the presence of an acid such as sulfuric acid; reduction of the nitroso compound by a suitable hydrogenation procedure, for instance, by means of the reaction of a metal such as zinc with an acid such as sulfuric; and isolation of the resulting amino compound. A general schematic description of this method is as follows:

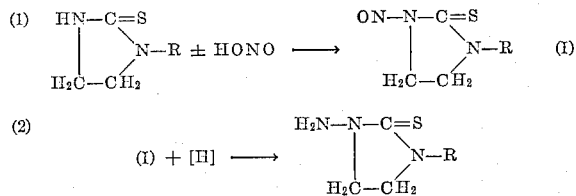

wherein R represents a member of the group consisting of hydrogen and hydroxyethyl.

My new 3-amino-2-imidazolidinethiones lend themselves readily to condensation with carbonyl compounds such as 5-nitro-2-furfural. Such condensation can be carried out by treating an aqueous solution of the amino compound with a solution of 5-nitro-2-furfural.

In order that my invention may be readily available to those skilled in the art the following examples are described briefly.

EXAMPLE I

3-Amino-2-Imidazolidinethione

To a mixture of 1100 cc. of 2 N sulfuric acid and 400 cc. of dioxane is added 40.7 gm. (0.4 mole) of 2-imidazolidinethione. During about one hour a solution of 27.5 gm. (0.4 mole) of sodium nitrite dissolved in 100 cc. of water is added at about 0° C. After stirring for about 30 minutes at 0° C., 60 gm. of zinc dust is added during 15 minutes so that the temperature does not exceed 10° C. Stirring is continued for about 10 minutes. The excess zinc is filtered and the filtrate chilled whereupon crystals of 3-amino-2-imidazolidinethione, M.P. 179–180° C., are deposited.

To prepare 3-(5-nitrofurfurylideneamino)-2-imidazolidinethione, equimolar quantities of 5-nitro-2-furfural and 3-amino-2-imidazolidinethione are brought together. This is preferably accomplished by preparing an acidified aqueous solution of 3-amino-2-imidazolidinethione and adding thereto a solution of 5-nitro-2-furfural in alcohol. In lieu of 5-nitro-2-furfural a derivative thereof which is hydrolyzable thereto (e.g. 5-nitro-2-furfural diacetate) may be employed satisfactorily.

EXAMPLE II

1-(2-Hydroxyethyl)-3-Amino-2-Imidazolidinethione

To a mixture of 48.3 gm. (0.33 m.) of 1-(2-hydroxyethyl)-2-imidazolidinethione, 330 cc. of dioxane and 180 cc. of 2 N sulfuric acid is added a solution of sodium nitrite (22.7 gm. in 65 cc. of water) at −1° to −6° C. over a period of 32 minutes. The mixture is stirred at −2° to 2° C. for about 50 minutes. To it is added 725 cc. of 2 N sulfuric acid at ±2° C. Then zinc dust (45.0 gm.) is added at −2° C. to −4° C. over a period of 13 minutes, followed by stirring at ±3° C. for 22 minutes. The solution is filtered, the filtrate made alkaline with a base such as sodium carbonate and again filtered. The filtrate is concentrated to dryness. The residue is extracted with an organic solvent, for instance, acetone; the acetone removed by distillation and the residue (22% yield) recrystallized from chloroform to yield crystals (14% yield; M.P. 88–89° C.) of 1-(2-hydroxyethyl)-3-amino-2-imidazolidinethione.

To prepare 1-(2-hydroxyethyl)-3-(5-nitrofurfurylideneamino)-2-imidazolidinethione, the procedure described in Example I for the preparation of the nitrofuran compound thereof is employed.

What I claim is:

1-(2-hydroxyethyl)-3-amino-2-imidazolidinethione represented by the formula

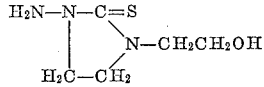

References Cited in the file of this patent
UNITED STATES PATENTS

| | | |
|---|---|---|
| 2,610,181 | Hayes | Sept. 9, 1952 |
| 2,746,960 | Gever et al. | May 22, 1956 |
| 2,776,979 | Michels | Jan. 8, 1957 |
| 2,830,046 | Hayes | Apr. 8, 1958 |
| 2,920,074 | Michels | Jan. 5, 1960 |